United States Patent [19]

Liles et al.

[11] Patent Number: 5,449,716
[45] Date of Patent: Sep. 12, 1995

[54] FUNCTIONAL POLYORGANOSILOXANE EMULSIONS FROM DIHYDROLYZABLE SILANES AND PHOTOCURABLE COMPOSITIONS THEREFROM

[75] Inventors: Donald T. Liles; David L. Murray, both of Midland, Mich.

[73] Assignee: Dow Corning Corporation, Midland, Mich.

[21] Appl. No.: 268,349

[22] Filed: Jun. 30, 1994

[51] Int. Cl.$^6$ .............................................. C08L 83/04
[52] U.S. Cl. ...................................... 524/837; 522/84; 522/86
[58] Field of Search ...................... 524/837; 522/84, 86

[56] References Cited

U.S. PATENT DOCUMENTS

| | | | |
|---|---|---|---|
| 2,891,920 | 6/1959 | Hyse et al. | 260/29.2 |
| 3,294,725 | 12/1966 | Findlay et al. | 260/29.2 |
| 4,273,634 | 6/1981 | Saam et al. | 204/159 |
| 4,370,160 | 1/1983 | Ziemelis | 71/117 |
| 4,618,642 | 10/1986 | Schoenherr | 524/425 |
| 4,782,112 | 11/1988 | Kondo et al. | 524/837 |
| 4,954,565 | 9/1990 | Liles | 524/860 |
| 5,089,537 | 2/1992 | Liles | 522/84 |
| 5,094,849 | 3/1992 | Cullinan et al. | 424/85.91 |

FOREIGN PATENT DOCUMENTS 228064  10/1986  Japan .......................... C08L 83/08

Primary Examiner—Melvyn I. Marquis
Attorney, Agent, or Firm—Richard I. Gearhart

[57] ABSTRACT

A non-crosslinked polymer, comprising a preformed aqueous emulsion having a plurality of silanol-terminated polydiorganosiloxane particles, a functionalizing silane having the formula $RQSi(X)_2$ where X is a hydrolyzable group, Q is an organic functional group which does not prevent a condensation reaction between X and a silanol-terminated polydiorganosiloxane molecule, R is Q, or a saturated monovalent hydrocarbon group of from one to six carbon atoms, and an organotin catalyst. The composition results in a non-crosslinked polymer, unlike the polymers described in the prior art. It has been found that adding a functionalizing silane having only two hydrolyzable groups to a preformed polydiorganosiloxane emulsion results in functionalized polydiorganosiloxane molecules free of crosslinks between the polydiorganosiloxane chains.

14 Claims, No Drawings 5,449,716

FUNCTIONAL POLYORGANOSILOXANE EMULSIONS FROM DIHYDROLYZABLE SILANES AND PHOTOCURABLE COMPOSITIONS THEREFROM

FIELD OF THE INVENTION

The invention relates to a method of end-capping a polydiorganosiloxane molecule with a functional silane, and the compositions resulting therefrom.

BACKGROUND OF THE INVENTION

U.S. Pat. No. 4,273,634 to Saam et al. teaches an aqueous silicone emulsion which provides an elastomeric product upon removal of the water under ambient conditions. The emulsion comprises a continuous water phase and a dispersed phase of crosslinked silicone. The silicone phase is the product of radical produced crosslinking of hydroxyl endblocked polydiorganosiloxane. The polydiorganosiloxane is crosslinked after it has been dispersed in water. Preferred polydiorganosiloxanes contain vinylsubstituted siloxane units and can be crosslinked by high energy radiation or the combined action of heat and an organic peroxide. However, the present invention is distinguished from the '634 patent because the present invention teaches a method of placing the functionalizing silane on the ends of the polydiorganosiloxane molecule, rather than randomly on the polydiorganosiloxane molecule as disclosed in the '634 patent. Also, the '634 discloses precuring the polydiorganosiloxane emulsion, whereas the present invention does not.

U.S. Pat. No. 4,370,160 to Ziemelis teaches microparticles, such as microspheres and microcapsules, comprising a solid organopolysiloxane are prepared by irradiating a dispersion of discrete entities with ultraviolet light. The discrete entities are dispersed in a UV-transparent fluid continuous phase and are sphere-like particles of a UV-curable, liquid organopolysiloxane composition containing a material to be encapsulated. The microparticles may be elastomeric or resinous and are useful as filler particles and time-release capsules. The present invention does not teach the preparation of microparticles.

U.S. Pat. No. 4,618,642 to Schoenherr, teaches an aqueous silicone elastomeric emulsion that is obtained by mixing an anionic emulsion containing dispersed particles of hydroxyl endblocked polydiorganosiloxane, dialkyltindicarboxylate, silane of the formula RSi(OR')$_3$ where R is a monovalent hydrocarbon radical of from 1 to 4 carbon atoms inclusive and R' is a lower alkyl radical of from 1 to 4 carbon atoms inclusive or a radical of the formula —N=CR$_2$ and inert, non-siliceous filler. Unlike the '642 patent, the present invention does not teach the use of R'Si(OR')$_3$ in the composition.

U.S. Pat. No. 4,782,112 to Kondo et al. teaches a mixture of (A) a silicone water-based emulsion composed of water, emulsifying agent, and diorganopolysiloxane having at least 2 silicone-bonded hydroxyl groups in each molecule, (B) a silicone water-based emulsion composed of water, emulsifying agent, and organohydrogen-polysiloxane having at least 2 silicon-bonded hydrogen atoms in each molecule, and (C) curing catalyst. It is characterized by an excellent storage stability, and by the formation on curing of a rubbery elastomeric coating film which has an excellent alkali resistance, water repellency, water-repellant sealability, and durability of adhesion. The '112 patent, however, does not teach the addition of a functionalizing silane to the polysiloxane as does the present invention.

U.S. Pat. No. 4,954,565 to Liles teaches a shelf stable aqueous silicone emulsion which yields an elastomer upon removal of the water, produced by combining a hydroxy endblocked polydiorganosiloxane present as an emulsion of dispersed particles in water, a crosslinker, and a tin catalyst, the tin catalyst being in the form of a divalent tin atom combined with organic radicals. The emulsion, after crosslinking of the polydiorganosiloxane, can be reinforced with colloidal silica without affecting the shelf life of the reinforced emulsion. The '565 patent, however, differs from the present invention because the composition of the '565 patent does not include a dialkoxy functionalizing silane. Moreover, the '565 patent does not teach adding dihydrolyzable silanes to silanol functional polymers to form non-crosslinked polymers which are now functionalized.

U.S. Pat. No. 5,084,849 to Liles teaches a silicone emulsion prepared by emulsion polymerizing a hydroxyl endblocked polydiorganosiloxane oligomer with a combination of a siloxane or siloxane precursor containing unsaturated hydrocarbon groups and a functional silicone selected from the group consisting of organosilicon hydrides and mercapto alkylsilanes or siloxanes, or with an acryl or methacryl functional siloxane. In the '849 patent, however, the functional silicone is polymerized concurrently with the siloxane. In the present invention, the functional silane is grafted onto the ends of the polymer after the siloxane polymer has finished polymerization.

U.S. Pat. No. 5,089,537 to Liles teaches a silicone emulsion prepared by emulsion polymerizing a hydroxyl endblocked polydiorganosiloxane oligomer with a combination of a siloxane or siloxane precursor containing unsaturated hydrocarbon groups and a functional silicone selected from the group consisting of organosilicon hydrides and mercaptoalkylsilanes or siloxanes, or with an acryl or methacryl functional siloxane. When the emulsion of the copolymer produced is combined with a photoinitiator, the copolymer can be crosslinked by exposure to ultraviolet radiation. When the water is removed, an elastomer results. The emulsion can be used to produce coatings and sealants. Unlike the present invention which places the functionalized silane on the ends of the polydiorganosiloxane molecule, the '537 patent teaches that the functionalized silane is emulsion polymerized with the polydiorganosiloxane.

Japanese Kokai Patent No. SHO 61[1986]-228064 teaches a composition containing organopolysiloxane, polyvinyl alcohol and/or cellulose derivatives, sensitizer, and water to obtain photocurable silicone emulsion compositions. The present invention does not contain polyvinyl alcohol and/or cellulose derivatives in the composition.

SUMMARY OF THE INVENTION

The present invention relates to a non-crosslinked functionalized emulsion polymer, comprising:

(A) a preformed aqueous polydiorganosiloxane emulsion comprising water, a surfactant, and a plurality of silanol-terminated polydiorganosiloxane molecules;

(B) a functionalizing silane having the formula:

$$RQSi(X)_2$$

where
- X is a hydrolyzable group,
- Q is an organic functional group which does not prevent a condensation reaction between X and a silanol-terminated polydiorganosiloxane molecule,
- R is Q, or a saturated monovalent hydrocarbon group of from one to six carbon atoms; and
- (C) an organotin catalyst.

The above described composition results in a non-crosslinked emulsion polymer, unlike the emulsion polymers described in the prior art. The inventors have surprisingly found that adding a functionalizing silane having only two hydrolyzable groups to a preformed aqueous polydiorganosiloxane emulsion results in functionalized polydiorganosiloxane molecules free of crosslinks between the polydiorganosiloxane chains.

When the functionalizing silane is added to the polydiorganosiloxane emulsion in the presence of an organotin catalyst an end-capped polymer results, consisting of a polydiorganosiloxane chain having a functional group on each end. By "functional group" it is meant a reactive group that may be used in further chemical reactions.

Unlike other functionalized polydiorganosiloxane emulsions in which the functional alkoxy silane is incorporated randomly during copolymerization, the method of this present invention allows for specific placement of the functionalizing silane at the chain end. This result is achieved by specifically selecting a functionalizing silane having two hydrolyzable groups and adding this silane after polymerization along with a tin catalyst.

The inventors have surprisingly found that once one of the hydrolyzable groups of the functionalizing silane condenses with the hydroxyl group of the polydiorganosiloxane molecule, the remaining hydrolyzable group on the silane is non-reactive in the system. Since the second group on the functionalizing silane is non-reactive, no chain extension or further reaction occurs between the polydiorganosiloxane chains, while the functional groups thereon remain reactive. The functionalized polyorganosiloxane emulsions of the present invention have the physical characteristics of a gum, once the water is removed.

The resulting functionalized polydiorganosiloxane emulsion of the present invention can be used as an intermediate; for example, if the polydiorganosiloxane is end-capped with a photosensitive organic end group and mixed with a photoinitiator, then the emulsion of the present invention will form a clear, waterproof coating which cures to a tack free elastomer upon exposure to ultraviolet radiation or sunlight. The functionalized polydiorganosiloxane emulsion of the present invention can also be used as an intermediate for improving the impact properties of engineering materials, such as epoxy resins or polystyrene. The method and compositions resulting therefrom are disclosed in a copending application U.S. Ser. No. 08/269,239, filed Jun. 30, 1994, titled "POLYSTYRENE MODIFIED WITH A TELECHELIC POLYORGANOSILOXANE", which is hereby incorporated by reference.

The functionalized polydiorganosiloxane emulsions of the present invention are in contrast to systems known in the prior art, which employ trialkoxy silanes. If a trialkoxy silane is used, the resulting compositions consist of elastomeric polydiorganosiloxanes which upon removal of water produce elastomeric films that are insoluble in solvent, whereas the present invention consists of non-crosslinked functionalized polydiorganosiloxane emulsions which form tacky gum-like films soluble in solvent when the water is removed.

DETAILED DESCRIPTION OF THE INVENTION

The present invention relates to a non-crosslinked functionalized emulsion polymer, comprising:
- (A) a preformed aqueous polydiorganosiloxane emulsion comprising water, a surfactant, and a plurality of silanol-terminated polydiorganosiloxane molecules;
- (B) a functionalizing silane having the formula:

$$RQSi(X)_2$$

where
- X is a hydrolyzable group,
- Q is an organic functional group which does not prevent a condensation reaction between X and a silanol-terminated polydiorganosiloxane molecule,
- R is Q, or a saturated monovalent hydrocarbon group of from one to six carbon atoms; and
- (C) an organotin catalyst.

The aqueous emulsion having a plurality of particles of silanol-terminated polydiorganosiloxane is prepared by conventional methods well known in the art. In addition to the polydiorganosiloxane and water, this component also contains at least one surfactant which stabilizes the dispersed polydiorganosiloxane particles in the emulsion. The polydiorganosiloxane particles of this emulsion should have an average size of about 0.1 to about 10 microns, preferably from about 0.5 to about 1 microns and be characterized by a weight average molecular weight of greater than about 1,000. It is preferred that the above described emulsion have a solids content ranging from about 20 to about 70 weight percent, most preferably about 65 weight percent.

These emulsions are well known in the art and may be prepared, for example, by methods wherein cyclic or linear diorganosiloxane species are dispersed in an aqueous continuous phase with the aid of the above mentioned surfactant and are thereafter emulsion polymerized by the introduction of an acid or base catalyst. These methods can be illustrated by the disclosures of among others, U.S. Pat. No. 3,294,725 to Findlay et al. and U.S. Pat. No. 2,891,920 to Hyde et al., which are hereby incorporate by reference. In preferred embodiments of the emulsion, the surfactant employed is an anionic type, such as sodium lauryl sulfate or ammonium lauryl sulfate, and the catalyst is dodecylbenenzene sulfonic acid, the latter also acting as a surfactant in the system. The emulsions taught in U.S. Pat. No. 4,618,642 to Schoenherr and U.S. Pat. No. 4,954,565 to Liles, may also be used in the present invention and these patents are hereby incorporated by reference. The hydroxyl terminated polydiorganosiloxane emulsion can also be prepared by direct emulsification. In this process, a mixture of water, polydiorganosiloxane and one or more surfactants is processed under high shear conditions using either conventional mixing equipment or high shear devices such as a homogenizer. Methods for preparing these polymer emulsions are given in U.S. Pat. No. 4,177,177 to Vanderhoff, et al., which is hereby incorporated by reference.

The organic groups pendant from the backbone of the polydiorganosiloxane emulsion are independently selected from hydrocarbon or halogenated hydrocarbon radicals such as alkyl and substituted alkyl radicals containing from 1 to 20 carbon atoms; cycloalkyl radicals, such as cyclohexyl; and aromatic hydrocarbon radicals, such as phenyl, benzyl and tolyl. Preferred organic groups are lower alkyl radicals containing from 1 to 4 carbon atoms, phenyl, and halogen-substituted alkyl such as 3,3,3-trifluoropropyl. Thus, the polydiorganosiloxane can be a homopolymer, a copolymer or a terpolymer containing such organic groups. Examples include systems comprising dimethylsiloxy units and phenylmethylsiloxy units; dimethylsiloxy units and diphenylsiloxy units; and dimethylsiloxy units, diphenylsiloxy units and phenylmethylsiloxy units, among others. Most preferably, the polydiorganosiloxane is a polydimethylsiloxane which is terminated with a hydroxyl group at each end of its molecule.

The functionalizing silane is a silane having the following formula:

$$RQSi(X)_2$$

and partial hydrolysis condensation products thereof.

The group Q of the functionalizing silane is an organic functional group which does not prevent a condensation reaction between X and the silanol-terminated polydiorganosiloxane molecule. By "functional group" it is meant a reactive group that may be used in further chemical reactions.

The term "condensation reaction" as used herein means a type of chemical reaction in which two or more molecules combine with the separation of water, alcohol, or other simple substances. It is anticipated that there may be certain groups Q which because of stearic factors would prevent a condensation reaction between the hydrolyzable group X and the silanol-terminated polyorganosiloxane molecules. Molecules having groups which would prevent the aforesaid condensation reaction are excluded from the scope of this invention.

R is Q or a saturated monovalent hydrocarbon group of from one to six carbon atoms.

X can be any hydrolyzable group. The term "hydrolyzable group" means any group attached to the silicon which is hydrolyzed by water at room temperature. The hydrolyzable group X includes hydrogen, halogen atoms such as F, Cl, Br or I; groups of the formula —OY when Y is any hydrocarbon or halogenated hydrocarbon group such as methyl, ethyl, isopropyl, octadecyl, allyl, hexenyl, cyclohexyl, phenyl, benzyl, beta-phenylethyl, any hydrocarbon ether radical such as 2-methoxyethyl, 2-ethoxyisopropyl, 2-butoxyisobutyl, p-methoxyphenyl or —(CH$_2$CH$_2$O)$_2$CH$_3$; or any N,N-amino radical such as dimethylamino, diethylamino, ethylmethylamino, diphenylamino, or dicyclohexylamino. X Can also be any amino radical such as NH$_2$, dimethylamino, diethylamino, methylphenylamino or dicyclohexylamino; any ketoxime radical of the formula —ON=CM$_2$ or —ON=CM' in which M is any monovalent hydrocarbon or halogenated hydrocarbon radical such as those shown for Y above and M' is any divalent hydrocarbon radical both valences of which are attached to the carbon, such as hexylene, pentylene or octylene; ureido groups of the formula —N(M-)CONM''$_2$ in which M is defined above hydrocarbon radical such as those shown for Y above and M'' is H or any of the M radicals; carboxyl groups of the formula —OOCMM'' in which M and M'' are defined above or halogenated hydrocarbon radical as illustrated for Y above, or carboxylic amide radicals of the formula —NMC=O(M'') in which M and M'' are defined above. X can also be the sulfate group or sulfate ester groups of the formula —OSO$_2$(OM) where M is defined above hydrocarbon or halogenated hydrocarbon radical illustrated for Y; the cyano group; the isocyanate group; and the phosphate group or phosphate ester groups of the formula —OPO(OM)$_2$ in which M is defined above.

The most preferred hydrolyzable groups of the invention are alkoxy groups. Illustrative examples of the alkoxy groups are methoxy, ethoxy, propoxy, butoxy, isobutoxy, pentoxy, hexoxy, 2-ethylhexoxy, and the like; alkoxy radicals such as methoxymethoxy, ethoxymethoxy, and the like; and alkoxyaryloxy such as ethoxyphenoxy and the like. The most preferred alkoxy groups are methoxy or ethoxy.

In a more preferred embodiment the functionalizing silane is:

$$R''Q'Si(OR')_2$$

R' is an alkyl radical having 1 to 4 carbon atoms. Q' is selected from the group consisting of an acryloxypropyl, methacryloxypropyl, vinyl, allyl, chloroalkyl, hexenyl, acrylamidopropyl, trifluoropropyl, glycidoxypropyl, cyanoalkyl, mercaptoalkyl, aminoalkyl, a group represented by the formula

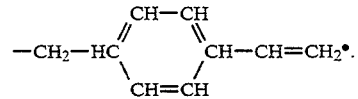

and a group of the formula HCl•ZN(H)-CH$_2$CH$_2$—N(-H)—CH$_2$CH$_2$CH$_2$—, wherein Z is

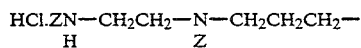

Specific examples of suitable functionalizing silanes include gamma-acryloxypropylmethyldimethoxysilane, gamma-methacryloxypropyl methyldimethoxysilane, vinylmethyldimethoxysilane, 5-hexenylmethyldimethoxysilane, allylmethyldimethoxysilane, 3-acrylamidopropyldimethoxysilane, mercaptopropylmethyldimethoxysilane, (3-glycidoxypropyl)methyldiethoxysilane, 2-(3,4)-epoxycyclohexyl)methyldiethoxysilane, 4-(aminophenyl)-2-ethylmethyldimethoxysilane, 3,3,3-trifluoropropylmethyldimethoxysilane, 3-chloropropylmethyldiemethoxysilane, 3-cyanopropylmethyldimethoxysilane, pheylmethyl- dimethoxysilane, and silanes represented by the formulas HCl•ZH-N—CH$_2$CH$_2$—NZ—CH$_2$CH$_2$CH$_2$—SiCH$_3$(OMe)$_2$ and HCl•ZN(H)—CH$_2$CH$_2$—N(H)—CH$_2$CH$_2$CH$_2$SiCH-$_3$(OMe)$_2$, wherein Me hereinafter denotes a methyl radical and Z is a vinylbenzyl group having the formula

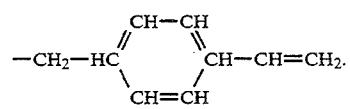

Finally, R'' is Q' or an alkyl radical having 1 to 4 carbon atoms.

The organotin curing catalyst (II) is an organic salt of tin and may be illustrated by tin (II) carboxylates, such as stannous oleate and stannous naphthanate; dialkyl tin (IV) carboxylates, such as dibutyltin diacetate and dibutyltin dilaurate; and tin (IV) stannoxanes, as exemplified by the structure (Bu)2SnCl-O-(Bu)2OH, in which Bu denotes a butyl radical, as taught by Stein et al. in U.S. Pat. No. 5,034,455. In preferred embodiments, the catalyst is stannous octoate.

To prepare the composition of the present invention, an organotin curing catalyst and a functionalizing silane are added to the above described preformed aqueous polydiorganosiloxane emulsion. The functionalizing silane migrates into the particles of the polyorganosiloxane where it condenses with the hydroxyl groups on the ends of the polydimethylsiloxane molecules in the presence of the organo tin catalyst. Unlike the other polyorganosiloxanes described above in the prior art, no cross-linking occurs between the polyorganosiloxane molecules in the present invention because the functionalizing silane contains only 2 hydrolyzable groups and therefore is incapable of crosslinking. This contrasts with the silanes taught in the prior art, in which the 3 or more hydrolyzable groups at the silicon atom of the silanes lead to a crosslined polyorganosiloxane emulsion which has the physical characteristics of an elastomer upon the removal of water. The non-crosslinked polyorganosiloxane emulsions of the present invention therefore have the physical characteristics of a gum upon removal of water.

Although the order of addition is not considered critical, it is preferred to first add from about 0.05 to about 2 parts by weight, preferably from about 0.3 to about 0.6 parts, of the catalyst to 100 parts by weight of the hydroxyl-terminated polydiorganosiloxane in emulsion. From about 0.1 to about 10 parts by weight, preferably about 1 part, of the functionalizing silane is then added to this mixture for each 100 parts by weight of the polydiorganosiloxane and the resultant emulison is allowed to age. Usually the aging process requires from one half hour to four hours at room temperature. When the functionalizing silane content is less than about 0.1 part, incomplete grafting is observed; when this component exceeds about 10 parts, the by-products formed when the hydrolyzable group X is reacted can destabilize the emulsion. During the aging process, which can take place at room temperature as well as at elevated temperatures, the pH of the emulsion should be maintained between 4 and 10.5.

As has been already indicated, the functionalized silicone emulsion polymer of the present invention can function as an intermediate for a variety of end-uses, such as but not limited to impact modifiers or coatings. For example, the functionalized silicone emulsion polymer can be used as an intermediate to prepare a photocurable composition. A photocurable coating of the type contemplated by this invention would comprise the functionalized silicone emulsion polymer prepared with selected functionalizing silanes and adding a photoinitiator thereto.

The functionalized silicone emulsion polymer used for the photocurable coating can be prepared using the preformed aqueous polydiorganosiloxane emulsion described above. The functionalizing silane, however, is a silane selected from among acryl, methacryl, mercaptoalkyl or alkyl vinylether groups.

The functionalizing silane should be a silane or siloxane which is compatible with the hydroxyl endblocked polydiorganosiloxane. These include methylvinyldialkoxy silanes, such as methyvinyldiethoxysilane. Also included are allyl or hexenyl functional siloxanes and siloxane precursors, such as allylmethyldiethoxysilane. Preferably there is from 0.1 to 10 parts by weight of functionalizing silane containing unsaturated hydrocarbon groups per 100 parts by weight of polydiorganosiloxane. A preferred embodiment uses methylvinyldiethoxysilane at a level of 1.0 part by weight per 100 parts by weight of hydroxyl endblocked polydiorganosiloxane.

Another functionalizing silane is mercaptoalkylsilane which is compatible with the hydroxyl endblocked polydiorganosiloxane. A suitable mercaptoalkylsilane is mercaptopropyl(methyl)diethoxysilane. A preferred embodiment uses mercaptopropyl(methyl)dimethoxysilane at a level of 0.5 to 1.0 part by weight-per 100 parts by weight of polydiorganosiloxane. Preferably there is used 1 mole of mercaptoalkylsiloxane unit per mole of unsaturated hydrocarbon unit.

The acryl or methacryl type functional silanes are preferably dialkoxyfunctional, all containing 1 or more acryl or methacryl functional radicals. Preferred acryl or methacryl functional silanes include 3-methacryloxypropylmethyldimethoxysilane, 3-methacryloxypropylmethyldiethoxysilane, and 3acryloxypropylmethyldimethoxysilane at a level of from 0.5 to 1.0 part by weight per 100 parts by weight of polydiorganosiloxane.

The photoinitiator can be one or a combination of the many photoinitiators that form radical species when irradiated with ultraviolet light. The photoinitiator should be compatible with the silicone phase of the emulsion. Preferred photoinitiators are benzophenone and Darocure ( Registered TM ) 1173, which has the formula,

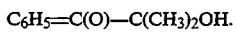

$C_6H_5\!=\!C(O)\!-\!C(CH_3)_2OH.$

The photoinitiator is used in amounts sufficient to provide the desired cure rate. If too little is used, the cure takes longer than desired. If too much photoinitiator is used, the physical and mechanical properties of the emulsion or cured elastomer may be degraded. The preferred amount is from 0.25 to 0.5 part of either preferred photoinitiator per 100 parts by weight of polydiorganosiloxane.

The photoinitiator may be added at any time to the reaction mixture. For example, the photointiator may be added to the preformed aqueous polydiorganosiloxane emulsion before the functionalizing silane is reacted therewith. The photoinitiator could also be added to the reaction mixture once the functionalized silicone emulsion polymer is formed.

The photoinitiator present in the emulsion reacts in the presence of the ultraviolet light to form radicals which cause reactions between the functional groups at the polymer chain ends of the silicone emulsion. For example, the radicals formed by the ultraviolet light and the photoinitiator cause the acryl groups to react with each other, causing crosslinks to form and changing the gum copolymer into an elastomer. When the crosslinked emulsion is cast into a film and dried, the elastomeric particles coalesce to form an elastomeric film. It is also possible to first remove the water from the emulsion and then expose the composition to ultraviolet light to cause the crosslinking. The emulsions containing the mercaptoalkyl group as well as those containing the acryloxy propyl group as the reactive crosslinker can be crosslinked by exposure to ambient sunlight, since these groups are very reactive.

Additional ingredients can be added to the emulsion to change the properties of the emulsion and of the elastomer formed by drying the emulsion. The physical strength of the elastomer can be increased by the addition of reinforcing filler. Any of the well known reinforcing fillers for silicone polymers can be used, such as fumed silica, precipitated silica, aqueous dispersed colloidal silica, and aqueous, dispersed fumed silica. The aqueous, dispersed fumed silica is a preferred reinforcing filler. Extending filler, such as clay and calcium carbonate, pigments, dyes, thickening agents, and such can be added as long as they do not adversely affect the properties or storage stability of the emulsion or the elastomer formed upon drying the emulsion.

The amount of ultraviolet radiation necessary to crosslink the emulsion copolymer into an elastomer will depend on a number of variables and therefore, the optimum amount should be determined experimentally. Factors such as wavelength of UV light, amount and type of photoreactive functional groups in the copolymer, quantity and type of photoinitiator and reactor design will all influence the amount of ultraviolet radiation required to crosslink the emulsion polymer. For example, the energy required to dissociate SH bonds into radicals is far less than that required to dissociate SiH bonds and thus emulsion copolymers containing the former require significantly less ultraviolet radiation to complete crosslinking processes than do emulsion copolymers containing the latter. However, the most preferred parameters are those which cause the composition to be cured by ambient sunlight or lower doses of ultraviolet radiation.

The emulsion of this invention is useful as a coating material which gives an elastomeric coating. It can be used as a protective coating or as a release coating. When reinforced, the elastomeric coating can be used as a coating material, an adhesive, or as a sealant material.

EXAMPLES

The following examples are presented to further illustrate the compositions of this invention, but are not to be construed as limiting the invention, which is delineated in the appended claims. All parts and percentages in the examples are on a weight basis and all measurements were obtained at 25° C., unless indicated to the contrary.

Example 1

A silanol functional polydimethylsiloxane (PDMS) latex was prepared by adding 34 g of dodecylbenzene sulfonic acid to 1200 g of water followed by 2,275 g of a 80 cp (25° C.) hydroxyl endblocked polydimethylsiloxane fluid. The mixture was stirred for 15 minutes and the resulting dispersion was homogenized by passing it twice through a Microfluidics Microfluidizer at 8000 psi. One hundred twenty grams (120 g) of Dowex ® HCl W2H Cationic Exchange resin (available from Dow Chemical Co., Midland, Mi.) was mixed into the emulsion to initiate polymerization. After standing at room temperature for 20 hours, the emulsion was filtered to remove the ion-exchange resin and neutralized to pH 7 using a 14% aqueous ammonium hydroxide solution. The resulting latex contained 62 wt. % polydimethyl- siloxane having a average particle size of 350 nm. The polymer molecular weight was analyzed by Size Exclusion Chromatography (SEC) using a Waters model 590 Programmable Pump System equipped with two 30 cm Polymer Labs Series C crosslinked polystyrene columns and a Model 410 refractive index detector. The molecular weights were determined in toluene by comparing the chromatogram to PDMS standards in toluene. A number average molecular weight of 29,600 g/mol and a weight average molecular weight of 269,000 g/mol were recorded.

To 400 g of the above polydimethylsiloxane emulsion, 1.3 g of stannous octanoate was added. The latex was stirred and 2.7 g of 3-methacryloxypropylmethyldiethoxysilane was added dropwise. After 24 hours, the emulsion pH was increased to 10 using a 14 wt. % ammonium hydroxide solution. The resulting methacryloxypropyl end-capped emulsion had a number average molecular weight of 34,600 and a weight average molecular weight of 277,000 g/mol indicating little or no chain extension.

Example 2

In a 1 liter flask, 200 g of a 65 wt. % solids methacryloxypropyl end-capped PDMS latex, prepared in similar fashion to Example 1, was diluted to 30 % solids by adding 235 g of de-ionized water. The reaction flask was then heated to 70 ° C. under a nitrogen blanket. 35 ml of methylmethacrylate containing 0.125 g of AIBN (azobisisobutyronitrile) was dripped into the emulsion at rate of 0.6 ml/min. After all monomer was added, the reaction was allowed to continue for 8 hours at 70° C. with constant stirring. After cooling to room temperature, the latex was then coagulated in isopropanol, filtered and vacuum dried. The resulting polymer was then analyzed for percent Si by a bomb digestion technique. This test demonstrated that polymer contained 80 wt. percent polydimethylsiloxane. Films cast from the latex were translucent indicating a inter-penetrating morphology. The films produced from this latex exhibited superior adhesion to plastic in comparison to the pure polydimethylsiloxane material.

Example 3

In a 1 liter flask, 200 g of a 65% solids methacryloxypropyl end-capped PDMS latex, prepared in the manner of Example 1, was diluted to 30 % solids by adding 235 g of de-ionized water. The reaction flask was then heated to 70° C. under a nitrogen blanket. 35 ml of butylacrylate containing 0,125 g of azobisisobutyronitrile was then dripped into the emulsion at rate of 0.6 ml/min. After all monomer was added, the reaction was allowed to continue for 8 hours at 70° C. with constant stirring. After cooling to room temperature, the latex was then coagulated into isopropanol, filtered and vacuum dried. The resulting polymer was then analyzed for percent Si by a bomb digestion technique. This test demonstrated that the polymer contained 80 wt. percent polydimethylsiloxane. Films cast from the resulting composition were translucent indicating a interpenetrating morphology. The films produced from this core shell latex exhibited superior adhesion to plastic in comparison to their pure silicone counterparts.

Example 4

One hundred fifty five grams (155 g) of 65 wt. % solids, of hydroxyl aqueous polydimethylsiloxane emulsion was weighed into a 500 ml jar equipped with a stirrer. 1.2 g of an aqueous emulsion of 50 wt percent of dioctyltin dilaurate was added drop wise to the emulsion and the emulsion was stirred for 3 minutes. Next, 1.0 g of (MeO)$_2$SiCH$_3$(CH$_2$)3OCOCH=CH$_2$, (3-acryloxypropylmethyldimethoxysilane) was added dropwise to the emulsion with continued stirring. To this emulsion was added 1.0 g of α,α hydroxymethylacetophenone, a photoinitiator, dropwise with stirring. The stirring was continued for an additional 30 minutes. This composition consisted of an approximately 60–62 percent solids emulsion of polydimethylsiloxane containing 0.5 pph dioctyltindiluarate, 1 pph 3-acryloxypropylmethyldimethoxy silane and 1 pph photoinitiator (Darocure 1173), all based on polymer weight.

A film of the functional emulsion was cast into a polystyrene petri dish and allowed to dry at room temperature for 2 days. The resulting film was a sticky, gummy polymer that was soluble in heptane. The film was then exposed to 950 mJ/cm$^2$ UV radiation by using a photocure apparatus which consisted of a UV light mounted above a moving belt. The film was transformed into an elastomer. A tensile strength of 50 psi, elongation to break of 875% and a modulus at 100 psi of 12 psi were recorded.

Example 5

A silanol functional polydimethylsiloxane latex was prepared by the method outlined in Example 1. To 400 g of the polydimethylsiloxane emulsion was added 1.3 g of stannous octanoate. The latex was stirred and 1.5 g of 3-mercapto propylmethyldimethoxysilane was added dropwise. After 24 hours, the above emulsion was taken to pH 10 using a 14 wt. % ammonium hydroxide solution. To 55 g of the mercapto end-capped PDMS emulsion was added 0.28 g of tetramethyltetravinylcyclosiloxane ({OSiCH$_3$CH$_2$CH=CH$_2$}4) and 0.14 g of DaroCure 1173 (C$_6$H$_5$COC(CH$_3$)$_2$OH). Films of the above latex were cast and allowed to dry for 16 hours. The films cured to an elastomer (i.e. were insoluble in heptane) after exposing the film to UV light.

Example 6 (Comparative Example)

A similar composition to Example 4 was prepared without a Sn compound. To 20 g of the OH end blocked PDMS latex was added 0.13 g of tetramethyltetravinylcyclosiloxane, 0.08 g of Daro Cure 1173 and 0.13 g of mercaptopropylmethyldimethoxysilane. After casting a film and allowing the latex to dry and exposing the film to UV light under the same conditions as Example 4, the film was still an uncrosslinked elastomer soluble in heptane.

Example 7

A silanol functional polydimethylsiloxane latex was prepared in accordance to Example 1. To 300 g of the OH end blocked polydimethylsiloxane emulsion was added 0.90 g of stannous octanoate. The latex was stirred and 1.8 g of 3-glycidoxypropylmethyldiethoxysilane was added dropwise. After 24 hours, 10 g of the latex was poured into a 10 cm polystyrene petri dish. Four drops of diethylenetriamine (NH$_2$CH$_2$CH$_2$NHCH$_2$CH$_2$NH$_2$) was stirred into the latex. Upon drying, an elastomer was produced that was insoluble in heptane.

Example 8

One hundred fifty five grams (155 g) of a anionically stabilized, non-crosslinked aqueous emulsion of hydroxy-endblocked polydimethylsiloxane having a molecular weight (Mw) of approximately 250,000 and a percent solids content of about 60–62% by weight prepared in accordance to method of Example 1 of previously cited U.S. Pat. No. 4,618,642 to Schoenherr was weighed into a 500 ml jar equipped with a stirrer. Next, 0.6 g of stannous octoate was added to the emulsion and stirred for 3 minutes. This was followed by 1.0 g of (MeO)$_2$SiMe(CH$_2$)$_3$—OCOCH=CH$_2$, (3-acryloxypropylmethyldimethoxysilane) which was added dropwise to the emulsion with continued stirring. After 10 minutes, the stirring was discontinued and the emulsion was allowed to remain undisturbed for an additional hour. An aqueous 35 percent aminomethylpropanol solution was added to the emulsion to adjust the pH to 10.0. To this emulsion was added 2.0 g of DaroCure 1173(C$_6$H$_5$COC(CH$_3$)$_2$OH), a photoinitiator, dropwise with stirring. Therefore, the composition consisted of an approximately 60–62 weight percent solids emulsion of polydimethylsiloxane containing 0.5 pph stannous octoate, 1 pph 3-acryloxypropylmethyldimethoxy silane and 2 pph photoinitiator (Darocure 1173), all based on polymer weight.

A film of the functional emulsion was cast into a polystyrene Petri dish and allowed to dry at ambient conditions for 2 days. The resulting film was a sticky, gummy polymer that was soluble in heptane. The film was then placed in the outdoor sunlight (temperature < 45 ° C.) for 8 days. The film was transformed into an elastomer that was insoluble in heptane. Samples of the film were tensile tested and had an average break stress of 24 psi, elongation to break of 450%, and a modulus at 100% elongation of 15 psi.

Example 9

Two hundred grams (200 g) of an anionically stabilized, non-crosslinked aqueous emulsion of hydroxyendblocked polydimethylsiloxane (PDMS) as in Example 8 was weighed into a 500 ml jar equipped with a stirrer. 0.6 g of stannous octoate was added to the emulsion, the stirrer was started and the mixture was stirred for three minutes. Next 1.2 g of (MeO)$_2$SiMe(CH$_2$)$_3$-OCOCH=CH$_2$, (3-acryloxypropylmethyldimethoxysilane), was added dropwise to the emulsion with stirring. The mixture was stirred for an additional five minutes after addition of all of the silane endcapper. The jar was capped and the emulsion was allowed to remain undisturbed for 24 hours. The pH of the emulsion was adjusted to between 9–10 by the dropwise addition with stirring of 14 percent aqueous ammonia. Darocure 1173, (0.6 g), was added to the emulsion dropwise with stirring and the composition was stirred for and additional 45 minutes. This composition consisted of an approximately 60–62 percent solids emulsion of polydimethylsiloxane containing 0.5 pph stannous octoate, 1 pph 3-acryloxypropylmethyldimethoxysilane and 0.5 pph photoinitiator (Darocure 1173), all based on polymer weight. A film cast from this emulsion (by removal of water) produced a sticky, gummy polymer that was soluble in heptane.

An aqueous colloidal suspension of CH$_3$SiO$_{3/2}$ was prepared by a method similar to that described in U.S. Pat. No. 3,433,780. Eight hundred fifty six grams (856.5 g) of distilled water was charged to a 2L 3-neck flask equipped with a dropping funnel and a stirrer. Two point seven seven grams (2.77 g) of dodecylbenzenesulfonic acid was added to the flask and the contents were stirred for 5 minutes to allow the DBSA to dissolve. Six grams (6 g) of 2N sodium hydroxide solution was added and pH of the solution was measured with pH paper and found to be between 10 and 11.5. Two hundred twenty five grams (225 g) of MeSi(OMe)₃ was added dropwise at a rate of about 1 drop ever 3.8 seconds. After approximately 8 hours, all of the silane had been added and the mixture was stirred for 16 hours more. The contents of the flask were charged to a single necked flask and methanol was removed under vacuum with gentle heating using a rotary evaporator. The resulting emulsion was transparent and had a bluish hue. It had a solids content of 10.6 percent by weight and a mean particle size of 63 nm.

One hundred twenty grams (120 g) of the colloidal suspension of $CH_3SiO_{3/2}$ was added to the above described emulsion and the mixture was stirred for 5 minutes. The emulsion now contained approximately 10 pph colloidal $CH_3SiO_{3/2}$ resin based on polymer. Five (5) films were cast from this emulsion by weighing 8 g into a 100mm diameter polystyrene Petri dish for each film and allowing them to dry uncovered for 3 days. The films were exposed to various intensities of uv radiation by using a photocurable apparatus which consisted of a uv light mounted above a moving belt. Intensity of the uv radiation was measured by a meter and recorded for each film. Each film became tack free and elastomeric after exposure to uv light. Tensile properties of the cured films were measured (Instron) and are given in Table I.

TABLE I

| UV Intens. mJ/cm2 | Tensile psi | Tensile MPa | Elongation % | Modulus @ 100% strain psi | Modulus @ 100% strain MPa |
|---|---|---|---|---|---|
| 260 | 101 | 0.70 | 149 | 66 | 0.45 |
| 520 | 136 | 0.94 | 600 | 65 | 0.45 |
| 1040 | 152 | 1.05 | 690 | 66 | 0.45 |
| 2080 | 157 | 1.08 | 665 | 68 | 0.47 |
| 4160 | 172 | 1.19 | 650 | 70 | 0.48 |
| 8320 | 178 | 1.23 | 633 | 74 | 0.51 |

Example 10 (Comparative Example)

A acryloxy-functional emulsion was prepared by a similar method of Example 4 in U.S. Pat. No. 5,084,489 to Liles as follows. To 744 g of a 80 centipoise hydroxyl end-blocked polydimethylsiloxane fluid was added 7.44 g of 3-acryloxypropylmethyldimethoxysilane. This mixture was then stirred into 374.2 g of de-ionized water containing 74.4 g of a 10 weight percent sodium lauryl sulfate solution in water. After mixing for 30 minutes, the suspension was then homogenized by passing it twice through a Microfluidics Microfluidizer at 8000 psi. 6.9 g of dodecylbenzene sulfonic acid (DBSA) was added to the emulsion to effect polymerization. After standing for 24 hours, the emulsion was neutralized to pH 8-10 with 2N aqueous sodium hydroxide.

To 100 g of the above emulsion was added 0.6 g of Darocure 1173. This emulsion contained approximately 60-62 percent solids of poly(dimethyl-co-acryloxypropylmethylsiloxane) and 1 pph photoinitiator (Darocure 1173), all based on polymer weight. Films were cast from this emulsion by weighing 8 g into a 100mmdiameter polystyrene Petri dish for each film and allowing them to dry uncovered for 3 days. Films of the above emulsion containing 10 pph 4 nm colloidal silica as Nalco 1115 silica were also cast at the same time into 100 mm diameter polystyrene Petri dishes.

Films were also prepared at the same time of an end-capped acryloxy emulsion prepared in similar fashion to Example 1 except only 1 pph Darocure was added to these films. The films from the end-capped and randomly copolymerized acrylate functional latices were then exposed to 1020 mJ/cm² UV radiation and their strengths were compared. Table 2 shows the result of the comparison and demonstrates that the end-capped polymer has superior elongation and lower modulus due to the fact that the molecular weight between cross-links is greater in the end-capped films than the randomly copolymerized samples.

TABLE 2

Comparison of Tensile Properties of the Copolymerized and End-Capped Latexes.

| Method of Acrylate Incorporation | Colloidal Silica | Tensile psi | Tensile MPA | Elongation % | Modulus @ 100% strain psi | Modulus @ 100% strain MPa |
|---|---|---|---|---|---|---|
| random | none | 57 | 0.39 | 405 | 16 | 0.11 |
| end-capping | none | 44 | 0.30 | 597 | 14 | 0.10 |
| random | yes | 222 | 1.53 | 236 | 117 | 0.81 |
| end-capping | yes | 158 | 1.09 | 410 | 70 | 0.48 |

The foregoing specification describes only the preferred embodiment and the alternate embodiments of the invention. Other embodiments may be articulated as well. It is expected that others will perceive differences which while differing from the foregoing, do not depart from the spirit and scope of the invention herein described and claimed.

We claim:

1. A non-crosslinked polymer comprising:
   (A) a preformed aqueous polydiorganosiloxane emulsion comprising water, a surfactant, and a plurality of silanol-terminated polydiorganosiloxane molecules;
   (B) a functionalizing silane having the formula:

$RQSi(X)_2$ 

where
   X is a hydrolyzable group,
   Q is selected from the group consisting of an acryloxypropyl, methacryloxypropyl, vinyl, allyl, chloroalkyl, hexenyl, acrylamidopropyl, trifluropropyl, glycidoxypropyl, cyanoalkyl, mercaptoalkyl, a group represented by the formula

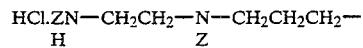

and a group of the formula HCl•ZN(H)—CH₂CH₂—N(H)—CH₂CH₂CH₂—, wherein Z is

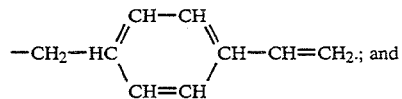

R is Q, or a saturated monovalent hydrocarbon group of from one to six carbon atoms; and
   (C) an organotin catalyst.

2. The composition according to claim 1, wherein said polydiorganosiloxane is a polydimethylsiloxane which is terminated with silanol groups.

3. The composition according to claim 1, wherein said organo tin catalyst is selected from the group consisting of a tin (II) carboxylate and a dialkyl tin (IV) carboxylate.

4. The composition according to claim 3, wherein said organo tin catalyst is stannous octoate.

5. The composition according to claim 4, wherein said functionalizing silane is 3-acryloxypropylmethyldimethoxysilane.

6. The composition according to claim 1, wherein the composition contains a filler.

7. The composition according to claim 1, wherein the composition contains a photoinitiator.

8. A method of preparing a coating comprising the steps of:
(I) mixing a composition comprising:
(A) a preformed aqueous polydiorganosiloxane emulsion comprising water, a surfactant, and a plurality of silanol-terminated polydiorganosiloxane molecules;
(B) a functionalizing silane having the formula:

$$RQSi(X)_2$$

where
X is a hydrolyzable group,
Q is selected from among acryl, methacryl, mercaptoalkyl or alkyl vinylether groups, R is Q, or a saturated monovalent hydrocarbon group of from one to six carbon atoms,
(C) an organotin catalyst, and
(D) a photoinitiator; and
(II) treating said composition with ultraviolet light.

9. The method according to claim 8, wherein said polydiorganosiloxane is a polydimethylsiloxane which is terminated with silanol groups.

10. The method according to claim 8, wherein said organo tin catalyst is selected from the group consisting of a tin (II) carboxylate and a dialkyl tin (IV) carboxylate.

11. The method according to claim 10, wherein said organo tin catalyst is stannous octoate.

12. The method according to claim 11, wherein said functionalizing silane is 3-acryloxypropylmethyldiethoxysilane.

13. The method according to claim 11, comprising the additional step of adding a filler.

14. A coating made from the method of claim 8.

* * * * *